Nov. 18, 1969  C. L. RAVER  3,479,063
FLUID PRESSURE TIGHTENED JOINT
Filed Dec. 24, 1968  2 Sheets-Sheet 1

INVENTOR
CLARENCE L. RAVER

BY *Kasmar Palmer, Stewart Estabrook*
ATTORNEYS

United States Patent Office 3,479,063
Patented Nov. 18, 1969

3,479,063
FLUID PRESSURE TIGHTENED JOINT
Clarence Leo Raver, Houston, Tex., assignor to Flex-Float Engineering Company, Houston, Tex., a corporation of Texas
Continuation-in-part of application Ser. No. 495,521, Oct. 13, 1965. This application Dec. 24, 1968, Ser. No. 787,307
Int. Cl. F16l 33/16
U.S. Cl. 285—108         9 Claims

ABSTRACT OF THE DISCLOSURE

In a fluid pressure tightened joint between two hollow members having opposed grooved flanges and means to prevent separation of the flanges, an annular carrier member is provided, the peripheral surfaces of which carry sealing rings which sealingly mate with such surfaces and the peripheral surfaces of the grooves.

---

This is a continuation-in-part of my copending application Ser. No. 495,521, filed Oct. 13, 1965, and now abandoned.

This invention relates to high pressure joints and couplings, and particularly to such joints designed to seal against high internal pressures and to maintain their seal despite the effects of thermal expansion and contraction which affect either the diameter of the joint or the lengths of the connected pipes or member, or both.

In U.S. Patent 2,687,229, dated Aug. 24, 1954, to Milton P. Laurent, there is described and claimed a pressure tightened joint for flanged pipe couplings. The pressure seal in the coupling described in that patent is effected by a ring member which is both internally and externally tapered and which fills and seals the tapered annular interval between two parts which are urged relative to one another such that fluid pressure tends to reduce the interval between them and at the same time force the ring into the interval. The reaction is in the direction in which the diameters of the convex and encircling concave surfaces diminish. Thus, the ring stresses are all compressive and oppose one another.

The present invention is directed to an improved joint and particularly a joint which utilizes a pair of rings of the type disclosed in the aforementioned Laurent patent.

It is the principal object of the present invention to provide a sealing ring carrier member which is basically annular in shape and which carries on its inner peripheral surfaces, a pair of sealing ring members in such a way that the two sealing rings and the carrier member form an integral sealing unit when assembled in a corresponding interval between two members subject to internal fluid pressure. The unit is useful, for example, in a standard RTJ ring joint and also in other joints to produce a highly effective fluid pressure actuated seal.

Other objects of the present invention will be apparent to those skilled in this art from a consideration of the following detailed description taken in conjunction with the attached drawings in which.

In general, the objects of the present invention are achieved by providing an annular sealing ring carrier member which carries on its inner surface a pair of pressure actuated sealing ring members and this thus assembled three part unit is insertable, for example, into a flange coupling or joint to effect a highly successful pressure actuated seal. While the drawings and description herein are directed primarily to a standard RTJ flange coupling it will be apparent that the invention is not so limited and in fact will have wide application in a variety of high pressure assemblies.

Figure 1:
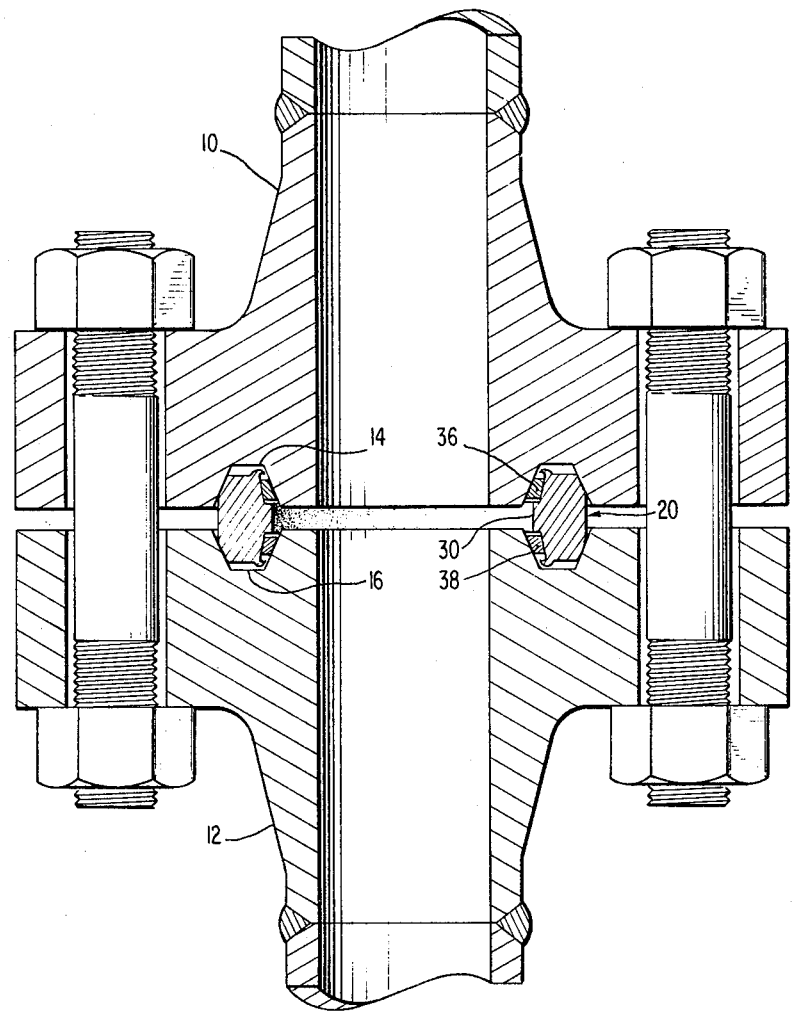
FIGURE 1 is a view in section of a fully assembled joint in accordance with the present invention.

Referring now to FIGURE 1, a standard ring type flange pipe coupling is shown which includes a pair of flanges 10 and 12 which are identical to each other and which include on their facing radial surfaces annular grooves 14 and 16. Conventionally, such flanges are secured to each other by a ring of bolts, two of which are shown in FIGURE 1.

Flanged pipe joints of the prior art have utilized various forms of packing to be placed in the grooves in the radial faces of the flanges which packings are forced into sealing relationship with the surfaces of the annular grooves by means of the ring of bolt members which may be tightened to effect the desired degree of compression of the packing material. As is the case with the joint in the aforementioned Patent 2,687,229, the seal in the present invention is not dependent upon the amount of force exerted on the coupling members by the ring of fastening bolts but rather is dependent once the joint has been initially set up only upon the internal pressure to which the coupling is subjected. Further, the sealing means as taught in the aforementioned patent actually float between the sealing surfaces between which they are disposed in response to fluid pressure variations in the line.

Figure 2:
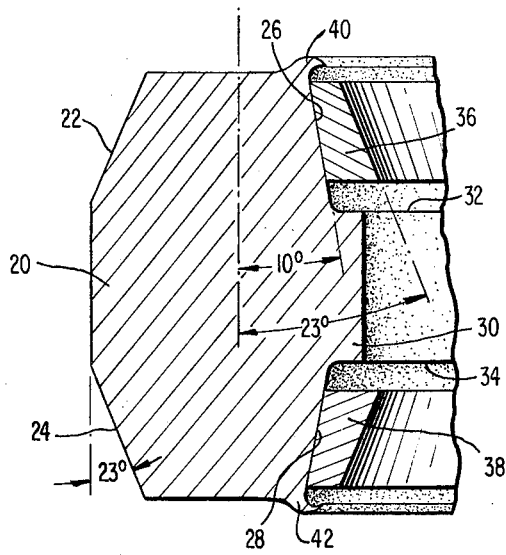
FIGURE 2 is an enlarged sectional view of the annular sealing ring carrier member which is clamped between the two flange sections shown in FIGURE 1.

Turning now to FIGURE 2 of the drawings, which shows in a sectional view, an enlarged detail of the annular sealing ring carrier member 20, it will be seen that the member 20 includes on its outer peripheral surface a pair of tapering surfaces 22 and 24, the taper of which corresponds substantially to the taper in the outer peripheral surface of the annular grooves in the radial faces of the flange members. The inner peripheral surface of the member 20 includes a second pair of tapering surfaces 26 and 28 and these surfaces are of substantially less taper than the surfaces 22 and 24. At its center section, the member 20 includes a radially inwardly extending collar 30 which forms oppositely disposed abutment faces 32 and 34. Positioned on the surfaces 26 and 28 are a pair of sealing rings 36 and 38 which are of the same type described in the aforementioned Laurent Patent 2,687,229. The abutment surfaces of the collar member it will be seen therefore serve to limit the extent of travel of the sealing ring members on the tapered surfaces 26 and 28. At the outermost ends of the inner tapered surfaces, lip members 40 and 42 are provided to retain the sealing rings on their respective surfaces of the carrier member 20. As clearly shown in FIGURE 2 therefore the three thus assembled units form an integral sealing unit the parts of which cannot become separated from each other. This entire assembly may thus be placed between a pair of standard flange couplings such as shown in FIGURE 1 and once the joint is tightened sufficiently to secure all parts in mating relationship as shown in FIGURE 1, a highly effective fluid pressure seal is effected between the surfaces 26 and 28 and the corresponding mating surfaces of the sealing rings and between the inner peripheral surface of the groove in the face of the flange and the corresponding sealing surface of the sealing rings. The fluid pressure seal effected by this joint is unaffected by temperature changes which tend to alter the physical dimensions of the joint itself or of pipes in which the joint may be placed. In response to an increase in pressure in the line, the sealing rings will move away from each other and thus increase the sealing effect. Conversely, a drop in pressure in the line results in the rings again more closely approaching each other but nevertheless retaining the fluid pressure seal.

Figure 3:
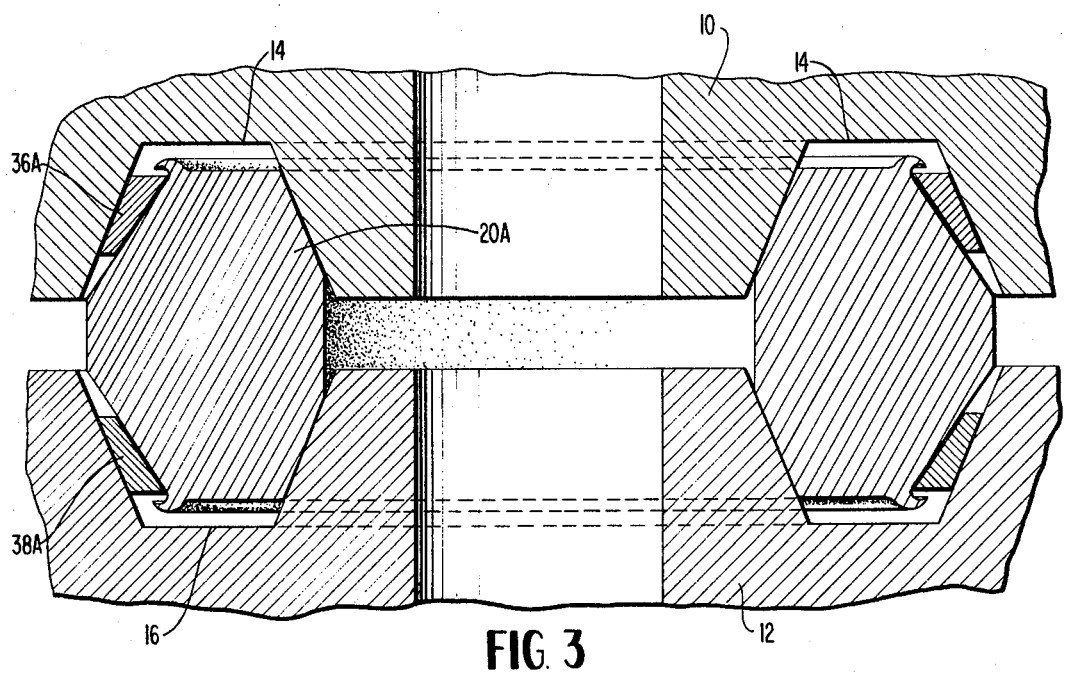
FIGURE 3 is a sectional view of an alternative embodiment of the device shown in FIGURES 1 and 2.

Referring now to FIGURE 3, the parts shown which are identical to those in FIGURE 1 have been given the same reference numerals. It will be readily apparent that the carrier member 20A shown in FIGURE 3 differs from the carrier member 20 of FIGURES 1 and 2 only in that its outer rather than its inner peripheral surfaces support the sealing rings 36A and 38A. The basic operation remains the same because the outer peripheral surfaces of the grooves 14 and 16 together with the outer peripheral surfaces of the carrier member 20A define an interval which narrows outwardly in the direction in which fluid pressure acts. Thus the rings 36A and 38A which are positioned in the interval tend to move in the direction in which fluid pressure acts and thereby maintain a pressure tight seal in the same manner as described with reference to FIGURE 1.

Figure 4:
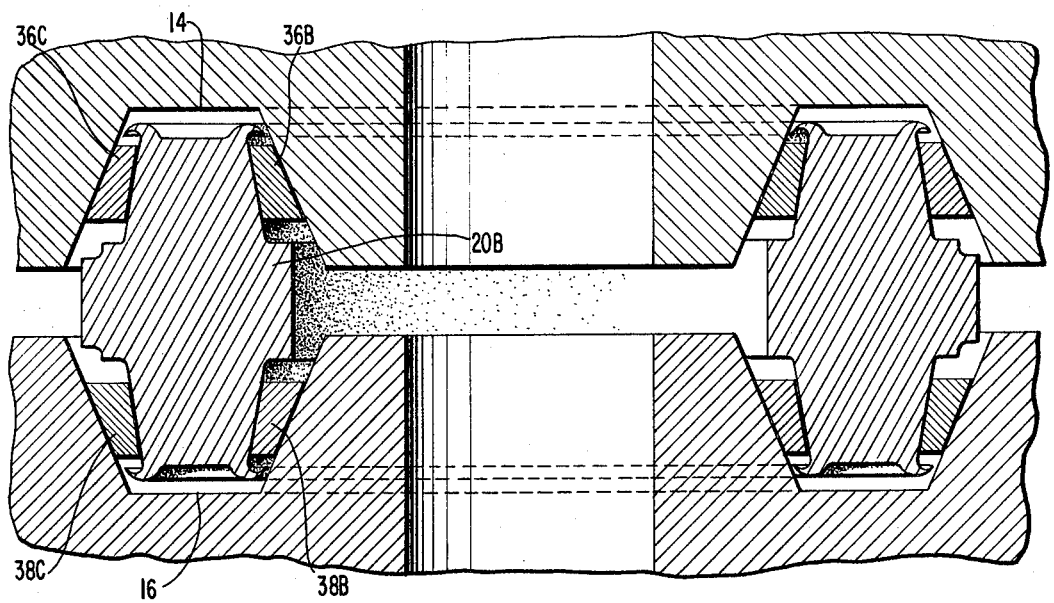
FIGURE 4 is a sectional view of a further alternative embodiment.

Referring lastly to FIGURE 4 of the attached drawings, the sealing ring structure shown here is such as to form a pressure tight seal regardless of the direction in which fluid pressure acts, that is, outwardly or inwardly of the joint. In this case, the carrier member 20B supports inner and outer sealing rings 36B and 38B and 36C and 38C. The inner peripheral sealing surfaces of the carrier 20B together with the inner peripheral sealing surfaces of the grooves 14 and 16 define therebetween an annular interval which narrows outwardly of the joint in the direction in which fluid pressure which is higher inside the joint than outside the joint would act thereby forcing the inner sealing rings 36B and 38B into sealing engagement with their respective sealing surfaces. The outer peripheral sealing surfaces of the carrier ring 20B together with the outer peripheral surfaces of the grooves 14 and 16 define therebetween an annular interval which narrows inwardly of the joint, that is, in a direction opposite to that of the interval between the inner peripheral sealing surfaces. The outer sealing ring members 36C and 38C which are positioned in this interval, will be urged inwardly of the joint in response to pressure conditions wherein the pressure in the joint is less than that outside of the joint. In this manner, a joint which embodies all of the basic operating characteristics described with reference to FIGURES 1 and 2 is operative to maintain a seal regardless of whether the high pressure side is within or without the joint members.

From the foregoing it is believed that those skilled in the art will readily recognize that there is herein shown and disclosed a new sealing arrangement useful for flange pipe joints of the standard RTJ type as well as other high pressure joints. All the advantages of the joint as taught in Laurent 2,678,229 are preserved and the assembly of the completed joint is easily effected in the field.

I claim:
1. A pressure tightened joint between two members arranged in aligned relation and subject to fluid pressure acting outwardly and tending to separate them, said joint comprising in combination:
 (1) two joint members each having a radial face thereon;
 (2) means engaging said members, serving to prevent separation thereof and holding the joint in assembled relation;
 (3) means defining an annular grove in the radial face of each member, said grooves in the assembled position of the joint being aligned with and facing each other;
 (4) an annular carrier ring member positioned within said grooves, at least the inner peripheral surfaces of said member defining together with the inner peripheral surfaces of said grooves annular intervals which narrow outwardly of the joint in the direction in which fluid pressure acts, said inner peripheral surfaces of said grooves and said inner peripheral surfaces of said member being related conoidal seal surfaces, said inner peripheral surfaces of said member being concave opposed to and surrounding the inner peripheral surfaces of said grooves which are convex, the apices of each pair of said conoidal surfaces lying on the same side of the joint plane, the apex angle of said inner surfaces of said member being the more acute;
 (5) and at least one pair of sealing rings of substantially rigid material supported on and carried by said member positioned in and bridging said annular intervals on opposite sides of said joint, the face of said rings toward the apices of said conoidal surfaces being fully exposed to fluid pressure within the joint, the relation between said conoidal surfaces being such that the concave conoidal surface conforms to an imaginary surface generated by the periphery of the ring when the ring while encircling the convex conoidal surface is forced toward the base thereof.

2. A pressure tightened joint between two members arranged in aligned relation and subject to fluid pressure acting outwardly and tending to separate them, said joint comprising in combination:
 (1) two joint members each having a radial face thereon;
 (2) means engaging said members, serving to prevent separation thereof and holding the joint in assembled relation;
 (3) means defining an annular groove in the radial face of each member, said grooves in the assembled position of the joint being aligned with and facing each other;
 (4) an annular carrier ring member positioned within said grooves and in engagement with the outer peripheral surfaces together wtih the inner peripheral surfaces of said grooves annular intervals which narrow outwardly of the joint in the direction in which fluid pressure acts, said inner peripheral surfaces of said grooves and said inner peripheral surfaces of said member being related conoidal seal surfaces, said inner peripheral surfaces of said member being concave opposed to and surrounding the inner peripheral surfaces of said grooves which are convex, the apices of each pair of said conoidal surfaces lying on the same side of the joint plane, the apex angle of said inner surfaces of said member being the more acute;
 (5) and a pair of sealing rings of substantially rigid material supported on and carried by said member positioned in and bridging said annular intervals on opposite sides of said joint, the face of said rings toward the apices of said conoidal surfaces being fully exposed to fluid pressure within the joint, the relation between said conoidal surfaces being such that the concave conoidal surface conforms to an imaginary surface generated by the periphery of the ring when the ring while encircling the convex conoidal surface is forced toward the base thereof.

3. A pressure tightened joint between two pipe flanges arranged in opposed aligned relation and subject to fluid pressure acting outwardly and tending to separate them, said joint comprising in combination:
 (1) two tubular members each having a flange with a radially extending face thereon;
 (2) means engaging said flanges serving to prevent separation thereof and holding the joint in assembled relation;
 (3) means defining an annular groove in the radial face of each flange, said grooves in the assembled position of the joint being aligned with and facing each other;
 (4) an annular carrier ring member positioned within said grooves and in engagement with the outer peripheral surfaces thereof, the inner peripheral surfaces of said member defining together with the inner peripheral surfaces of said grooves annular intervals which narrow outwardly of the joint in the direction in which fluid pressure acts, said inner peripheral surfaces of said grooves and said inner peripheral surfaces of said member being related conoidal seal surfaces, said inner peripheral surfaces of said member being concave opposed to and surrounding the inner peripheral surfaces of said grooves which are convex, the apices of each pair of related conoidal surfaces lying on the same side of the joint plane, the apex angle of said inner surfaces of said member being the more acute;

(5) and a pair of sealing rings of substantially rigid material supported on and carried by said member positioned in and bridging said annular intervals on opposite sides of said joint, the face of said rings toward the apices of said conoidal surfaces being fully exposed to fluid pressure within the joint, the relation between said conoidal surfaces being such that the concave conoidal surface conforms to an imaginary surface generated by the periphery of the ring when the ring while encircling the convex conoidal surface is forced toward the base thereof, said carrier including stop means at least at the outer end of its inner peripheral surfaces to prevent disengagement of said rings from said carrier.

4. A joint as defined by claim 2 in which at least one of said related conoidal seal surfaces is a right circular cone.

5. A joint as defined by claim 3 in which at least one of said related conoidal seal surfaces is a right circular cone.

6. A joint as defined by claim 2 in which said related conoidal seal surfaces are right circular cones.

7. A joint as defined by claim 3 in which said related conoidal seal surfaces are right circular cones.

8. The combination defined by claim 1 in which said annular carrier ring member includes both inner and outer peripheral surfaces which define together with the inner and outer peripheral surfaces of said groove, inner and outer annular intervals, the inner of which narrows outwardly of the joint and the outer of which narrows inwardly of the joint, said surfaces being related conoidal seal surfaces, the apex angle of said surfaces on said member being more acute than the apex angle on the surfaces of said groove;

and two pairs of sealing rings of substantially rigid material supported on and carried by said member positioned in and bridging said annular intervals on opposite sides of said joint, the face of the inner of said rings toward the apices of said conoidal surfaces being fully exposed to fluid pressure within the joint, the face of the outer of said pair of rings toward the base of its conoidal surfaces being fully exposed to fluid pressure outside the joint, the relation between adjacent pairs of said conoidal surfaces being such that the concave conoidal surface of each pair conforms to an imaginary surface generated by the periphery of the ring when the ring while encircling the convex conoidal surface is forced toward the base thereof.

9. A pressure tightened joint between two members arranged in aligned relation and subject to fluid pressure acting outwardly and tending to separate them, said joint comprising in combination:

(1) two joint members each having a radial face thereon;

(2) means engaging said members, serving to prevent separation thereof and holding the joint in assembled relation;

(3) means defining an annular groove in the radial face of each member, said grooves in the assembled position of the joint being aligned with and facing each other;

(4) an annular carrier ring member positioned within said grooves and in engagement with the inner peripheral surfaces thereof, the outer peripheral surfaces of said member defining together with the outer peripheral surfaces of said grooves annular intervals which narrow outwardly of the joint in the direction in which fluid pressure acts, said outer peripheral surfaces of said grooves and said outer peripheral surfaces of said member being related conoidal seal surfaces, said outer peripheral surfaces of said groove being concave opposed to and surrounding the outer peripheral surfaces of said member which are convex, the apices of each pair of said conoidal surfaces lying on the same side of the joint plane, the apex angle of said outer surfaces of said groove being the more acute;

(5) and a pair of sealing rings of substantially rigid material supported on and carried by said member positioned in and bridging said annular intervals on opposite sides of said joint, the face of said rings toward the apices of said conoidal surfaces being fully exposed to fluid pressure within the joint, the relation between said conoidal surfaces being such that the concave conoidal surface conforms to an imaginary surface generated by the periphery of the ring when the ring while encircling the convex conoidal surface is forced toward the base thereof.

References Cited

UNITED STATES PATENTS

| 1,866,160 | 5/1932 | Griswold | 285—336 X |
| 1,873,855 | 9/1932 | Wilson | 285—368 X |
| 2,422,009 | 6/1947 | Goetze | 285—336 X |
| 2,642,016 | 6/1953 | Thalmann. | |
| 2,687,229 | 8/1954 | Laurent | 285—113 X |
| 3,062,565 | 11/1962 | Word | 285—334.2 X |
| 3,207,523 | 9/1965 | Johnson | 277—190 X |

FOREIGN PATENTS 508,288   1/1955   Italy.

DAVID J. WILLIAMOWSKY, Primary Examiner

D. W. AROLA, Assistant Examiner

U.S. Cl. X.R.

285—113, 336, 379, 363; 277—143, 171, 190, 236